(12) United States Patent
Fortier et al.

(10) Patent No.: US 6,221,146 B1
(45) Date of Patent: Apr. 24, 2001

(54) METHOD FOR THE PRODUCTION OF PRECIPITATED CALCIUM CARBONATE HAVING A SELECTED CRYSTAL FORM, PRODUCTS PRODUCED THEREBY AND THEIR USES

(75) Inventors: Steven M. Fortier, Milledgeville; William B. Jackson, Sandersville, both of GA (US); Peter B. O'Rorke, Asheville, NC (US); Ricardo Perez, Cumming; David P. Bryan, McIntyre, both of GA (US)

(73) Assignee: Imerys Pigments, Inc., Marietta, GA (US)

( * ) Notice: Subject to any disclaimer, the term of this patent is extended or adjusted under 35 U.S.C. 154(b) by 0 days.

(21) Appl. No.: 09/285,152

(22) Filed: Apr. 1, 1999

Related U.S. Application Data

(60) Provisional application No. 60/080,726, filed on Apr. 3, 1998.

(51) Int. Cl.$^7$ .............................. C01F 11/18; C09C 1/02
(52) U.S. Cl. ................... 106/465; 106/464; 106/287.35; 423/432
(58) Field of Search ...................... 423/432; 106/287.35, 106/464, 465

(56) References Cited

U.S. PATENT DOCUMENTS

| | | | |
|---|---|---|---|
| 4,018,877 | 4/1977 | Woode | 423/165 |
| 4,367,207 | 1/1983 | Vanderheiden | 423/266 |
| 4,714,603 | * 12/1987 | Vanderheiden | 423/432 |
| 4,927,618 | 5/1990 | Mathur et al. | 423/430 |
| 5,007,964 | 4/1991 | Tsukisaka et al. | 106/465 |
| 5,232,678 | * 8/1993 | Bleakley et al. | 423/432 |

FOREIGN PATENT DOCUMENTS

401246129A * 10/1989 (JP) ...................................... 423/165

* cited by examiner

*Primary Examiner*—David Brunsman
(74) *Attorney, Agent, or Firm*—Finnegan, Henderson, Farabow, Garrett & Dunner, L.L.P.

(57) ABSTRACT

A method of producing a precipitated calcium carbonate (pcc) product which has a coarse crystalline form which comprises the steps of:

(a) preparing a suspension in an aqueous medium of calcium hydroxide particles which partially dissolve as calcium ions in the aqueous medium, the aqueous medium also incorporating an agent which promotes release into solution in the aqueous medium of calcium ions from the calcium hydroxide;

(b) adding carbon dioxide to the aqueous medium to react with the calcium ions therein to produce a suspension in the aqueous medium of a precipitate of calcium carbonate crystals;

(c) concentrating the suspension of the precipitate by a dewatering process; and (d) adding to the suspension of the precipitate a dispersing agent for the precipitate;

wherein in step (a) the calcium hydroxide particles of the suspension of calcium hydroxide particles have a specific surface area measured by the BET nitrogen method of less than 33 m$^2$/g and the said agent comprises a water soluble organic compound present in an amount of from about 0.010% to about 0.20% by weight based on the dry weight of calcium carbonate to be produced from the calcium hydroxide in the aqueous medium, and in step (b) the carbon dioxide is first added to the aqueous medium when the temperature of the aqueous medium is in the range from about 5° C. to about 12° C. and is added at a rate such that the average rate of reaction of carbon dioxide and calcium ions expressed as weight of precipitate per unit time per unit volume of aqueous medium is in the range from about 0.4 g/min/L to about 2.0 g/min/L.

16 Claims, No Drawings

METHOD FOR THE PRODUCTION OF PRECIPITATED CALCIUM CARBONATE HAVING A SELECTED CRYSTAL FORM, PRODUCTS PRODUCED THEREBY AND THEIR USES

This application claims benefit to Provisional Application 60/080,726, Apr. 3, 1998.

BACKGROUND OF THE INVENTION

The present invention relates to the production of precipitated calcium carbonate (pcc) having a selected crystal form and products produced thereby. In particular, the invention relates to the preparation of pcc products having a coarse crystalline form. Such products are useful in matte paper grades, i.e. grades in which the paper surface has a dull, low-gloss finish.

Manufacture of pcc products and the use of such products in compositions to make or coat paper are well known. However, there can be considerable variation in the properties of the pcc product depending upon the process conditions employed to prepare the product.

PCC products which are coarse i.e. have a mean particle size greater than 1.5 $\mu$m are known in the prior art, e.g. as described in U.S. Pat. No. 3,320,026, U.S. Pat. No. 4,882,310 wherein the particles are prismatic form and use of such coarse products in compositions to provide matte paper grades is also well known, e.g. from TAPPI Proceedings of 1982 Coating Conference, pages 143–146, "The influence of particle pigment shape on the performance of a paper coating, by Crenshaw; "Pigments for Matt Coated Papers" by Dr Billy Allwood, paper presented at PIRA Coated Paper Development Seminar held Sep. 13, 1990, Bolton, United Kingdom, U.S. Pat. No. 4,714,603 and U.S. Pat. No. 5,643,415 (WO9221613).

U.S. Pat. No. 4,714,603 describes a process for making such a coarse pcc product. The well known carbonation of slaked lime slurry using carbon dioxide is employed in the process described. A polyphosphate additive is included in the lime slurry to facilitate formation of coarse pcc particles. Carbonation is begun at a temperature of at least 15° C., preferably from 30° C. to 35° C. The particle form obtained is a spherical cluster or aggregate of fine nodules, e.g. containing up to 5,000 such nodules, the nodules having a height of from 0.02 $\mu$m to 1.0 $\mu$m.

U.S. Pat. No. 5,643,415 describes production of a coarse pcc and use of the same in coating paper to give a dull (matte) finish in the manner described in the earlier prior art specified above. The pcc crystal form is described as prismatic but the form illustrated in the Figures of the patent is roughly spheroidal rather than what is understood in the art to be prismatic. Polyphosphate, sodium hexametaphosphate, is added to a basic calcium carbonate (lime/pcc) slurry to assist crystal nucleation.

It is an object of the present invention to provide an improved process for producing a coarse pcc product for use in coating matte grade papers.

It is a further object of the present invention to provide an improved, selected pcc product form for use in coating matte grade papers and to provide a method of producing such a product form.

These and further objects which will become apparent from the following description are met by the present invention.

SUMMARY OF THE INVENTION

According to the present invention in a first aspect there is provided a method of producing a precipitated calcium carbonate (pcc) product which has a coarse crystalline form which comprises the steps of:

(a) preparing a suspension in an aqueous medium of calcium hydroxide particles which partially dissolve as calcium ions in the aqueous medium, the aqueous medium also incorporating an agent which promotes release into solution in the aqueous medium of calcium ions from the calcium hydroxide;

(b) adding carbon dioxide to the aqueous medium to react with the calcium ions therein to produce a suspension in the aqueous medium of a precipitate of calcium carbonate crystals;

(c) concentrating the suspension of the precipitate by a dewatering process; and (d) adding to the suspension of the precipitate a dispersing agent for the precipitate;

wherein in step (a) the calcium hydroxide particles of the suspension of calcium hydroxide particles have a specific surface area measured by the BET nitrogen absorption method of less than 33 m$^2$/g and the said agent comprises a water soluble organic compound present in an amount of from about 0.01% to about 0.20% by weight based on the dry weight of calcium carbonate to be produced from the calcium hydroxide in the aqueous medium, and in step (b) the carbon dioxide is first added to the aqueous medium when the temperature of the aqueous medium is in the range of from about 5° C. to about 12° C. and is added at a rate such that the average rate of reaction of carbon dioxide and calcium ions is in the range of from about 0.4 g/min/L to about 2.0 g/min/L.

According to the present invention in a second aspect there is provided a pcc product having a coarse, blocky particulate form as described further later in this specification, the product being produced by the method of the first aspect.

According to the present invention in a third aspect there is provided a coating composition for use in producing a matte grade coating on paper and other substrates which composition comprises an aqueous suspension of a particulate pigment together with a hydrophilic adhesive or binder, wherein the particulate pigment comprises the pcc product according to the second aspect of the invention.

DESCRIPTION OF THE INVENTION

The present invention provides a novel method of producing a pcc product having a coarse crystalline form in the manner defined earlier, a pcc product produced thereby, and a composition, for coating paper and the like, incorporating such a pcc product. The particles of the pcc product obtained may themselves comprise individual, coarse, crystals.

The particles of the pcc product after steps (c) and (d) of the method of the invention have been applied may have a median particle size (size at which 50% by weight of the particles are present in the particle size distribution—this size is known as "$d_{50}$") in the range of from about 1.8 $\mu$m to about 2.7 $\mu$m, especially about 2.0 $\mu$m to about 2.3 $\mu$m.

The median particle size and other particle size properties of the pcc product may be measured by the well known procedure of sedimentation, e.g. by use of a SEDIGRAPH™ particle size analysis instrument, e.g. a SEDIGRAPH™ 5100 instrument, available from Micromeritics Corporation. The "size" measured by this instrument is the diameter of an equivalent sphere which sediments at the same rate as the measured particle, the so called "equivalent spherical diameter".

The median particle size of the particles in the suspension produced immediately following step (b) may be from about 0.2 μm to about 0.6 μm greater than that of the particles of the pcc product following steps (c) and (d).

The particles obtained following steps (c) and (d) may beneficially comprise individual crystals which have a rhombic, prismatic or blocky form. Such a form is generally the rhombohedral habit of the calcite form of calcium carbonate.

At least 60%, preferably at least 65% by weight of the pcc product comprising the particles obtained following steps (c) and (d) may have a particle size of from 5 μm to 2 μm. Preferably, the pcc product obtained following steps (c) and (d) has less than 12% by weight of its particles, desirably less than 6% by weight of its particles having a size less than 1μm.

Preferably the specific surface area measured by the BET nitrogen absorption method of the particles of the pcc product obtained following steps (c) and (d) is not greater than 5.5 $m^2.g^{-1}$, desirably not greater than 4.5 $m^2.g^{-1}$. Desirably, the Blaine surface area of the particles of the pcc product is in the range 10,000 to 20,000 $cm^2.g^{-1}$. Blaine surface area is a measure of particle coarseness as determined by air permeability. Preferably the Blaine surface area is from 11,000 to 13,000 $cm^2.g^{-1}$.

The method according to the first aspect of the invention may be carried out without seeding, i.e. without the use of seed crystals of the required crystal form in the aqueous medium at the start of the reaction between the carbon dioxide and calcium ions to provide growth sites for the pcc crystals. Such use is time consuming and therefore costly to arrange in the setting up of a pcc production process.

The method according to the first aspect of the present invention may comprise a batch production process wherein up to a given maximum volume of a lime-containing aqueous medium, i.e. a medium comprising an aqueous suspension of calcium hydroxide, is employed in a reactor vessel, which may be of conventional form, and carbon dioxide is added to the aqueous medium in the vessel and mixed with the aqueous medium to provide the required reaction.

Lime or calcium hydroxide is sparingly soluble in water. Particles of lime will partially dissolve in water, i.e. until a maximum concentration of calcium ions therein is achieved. As calcium ions in solution are consumed by reaction with the carbon dioxide more lime dissolves until all of the solid lime is eventually consumed by dissolution and reaction with carbon dioxide. As conventionally practised in the art, the carbon dioxide addition may be continued at least until all of the lime is consumed in this way. This may be detected by a fall in pH of the aqueous medium, e.g. to a pH less than 9, preferably to a pH of about 7, using a conventional pH meter.

The solubility of lime in an aqueous medium is one of the factors which is dependent on the process conditions applied. The process conditions selected in the method according to the first aspect of the present invention are selected to promote the growth of coarse, rhombic, prismatic calcite crystals having the properties described earlier. Such an unusual combination of properties has not previously been employed in the art of pcc production.

In the method according to the first aspect of the invention, therefore, the combination of conditions employed in the method is an unobvious inventive selection which unexpectedly allows production of a pcc product having a rhombic, prismatic individual crystalline calcite form different from the spherical clusters described in U.S. Pat. No. 4,714,603 but having a selected coarse size, the particle size and form being especially suitable for use in producing matte grade papers.

By the method of the invention, the production of pcc may be carried out in a one stage process in contrast to the two stage process of U.S. Pat. No. 5,643,415 in which an intermediate basic pcc is first formed. The production by the method of the invention may also be carried out at lower temperatures and at quicker production rates and with lower additive amounts than the process of U.S. Pat. No. 5,643,415.

The production of pcc crystals in the aragonite form, which is undesirable for use in the said matte grade papers, may unexpectedly be avoided or minimised by the said selected combination of conditions.

Citric acid is preferred as the said additive.

The additive is preferably employed in an amount of from 0.1% to 0.15% by weight based on the dry weight of calcium carbonate to be precipitated.

It is not necessary for the additive to be employed with an inorganic substance, e.g. polyphosphate, such as sodium hexametaphosphate, as frequently employed in the prior art.

As noted above, lime is a sparingly soluble compound and agents such as the water soluble organic compound may be used to increase the number of $Ca^{++}$ ions in solution to improve process efficiency. It is very difficult to promote reasonable process efficiency without the use of a $Ca^{++}$ ion releasing agent.

Lime solubility also increases with decreasing temperature. However, we have found that the higher concentrations of $Ca^{++}$ in solution favours higher pcc nucleation rates which in turn produces pcc crystals which, for the production of matte grade paper coating products, are undesirably fine. As noted earlier, selection of the specified conditions surprisingly and beneficially allows a pcc product of excellent crystal form to be produced with optimum process efficiency.

It is to be noted that U.S. Pat. No. 4,714,603 teaches (column 4, lines 15–19) that carbonation starting temperatures of less than 15° C. should for the specific process and product described in that patent be avoided, because they result in undesirably small particles having an undesirably high surface area. However, we have found that use of such a temperature is not only possible but also necessary in the method according to the first aspect of the present invention wherein different conditions apply, including use of an organic agent during the carbonation reaction instead of the polyphosphate employed in the process described in U.S. Pat. No. 4,714,603.

The agent which promotes release into solution in the aqueous medium of calcium ions from the calcium hydroxide in the method according to the invention may comprise one or more of the water soluble organic additives known in the art for this purpose. The agent can also beneficially promote formation of coarse rhombohedral calcite crystals rather than fine aragonite crystals.

The water soluble organic additive may comprise a calcium chelating agent. Examples of suitable known additives are hydroxy carboxylic acids, especially hydroxypolycarboxylic acids, e.g. citric acid and malic acid, polyhydroxy carboxylic acids, precursors of such hydroxy acids, for example the corresponding lactones, oxyacids, e.g. oxydiacetic acid, polycarboxylic acids, e.g. phthalic acid, monosaccharides, e.g. glucose, di- or poly-saccharides, e.g. sucrose, polyhydroxy alcohols, e.g. sorbitol, hydroxy sulphonic acids, e.g. 4,5-dihydroxy-1,3-disulphonic acid, aminopolycarboxylic acids, e.g. ethylenediamine tetracetic acid (EDTA), aminotriacetic acid (nitrilotriacetic acid), aminodiacetic acid (imino diacetic acid) and salts of any of the above organic acids, e.g. sodium or other monovalent ion salts, and mixtures of any of these substances.

The lime or calcium hydroxide suspension to be employed in the method according to the first aspect of the invention may be prepared in the reactor vessel or in a separate vessel prior to addition to the reactor vessel. The lime is preferably calcium oxide obtained from calcination of naturally occurring calcium carbonate mineral sources. Calcium oxide may be converted into calcium hydroxide by addition to water, an addition which is known as 'slaking', in a known manner. The aqueous suspension of calcium hydroxide so formed is known as slaked lime or milk of lime. The slaking temperature determines the calcium hydroxide particle size which in turn later affects lime dissolution during the carbonation reaction. As specified earlier, the lime particle specific surface area obtained should be less than 33 BET, $m^2/g$ denoting lime particles which are not fine. Preferably, slaking is carried out isothermally using water (or a dilute aqueous medium) having a temperature at the start of the slaking process of less than 50° C., desirably less than 40° C., e.g. in the range 10° C. to 40° C. Desirably, the starting slaking temperature is from 15° C. to 38° C.

So called commercially available pcc grade calcium oxide having a suitably low impurity level and particle size is employed in the slaking procedure. Desirably particles of uniform size CaO are used.

The suspension of slaked lime formed may have a calcium hydroxide concentration of between 0.5 mole and 3.0 moles, especially 1.5 moles to 2.5 moles (the latter range being equivalent to an eventual pcc product concentration of from about 150 g/L to about 250 g/L). Desirably, the calcium hydroxide concentration is from about 1.8 moles to about 2.2 moles.

In the method according to the first aspect of the invention the calcium hydroxide may be in excess until near the end of the carbonation reaction when the carbon dioxide becomes in excess. Preferably the rate at which the carbonation reaction proceeds is at least 0.4 g/min/L, e.g. from 0.4 g/min/L to 2.0 g/min/L, especially from 0.6 g/min/L to 1.4 g/min/L. This is the weight of pcc produced per unit time per unit volume of the aqueous medium.

In the method according to the first aspect of the invention the temperature of the aqueous medium is desirably maintained to be in the range 5° C. to 12° C. desirably in the range 9° C. to 12° C. The temperature of the aqueous medium is desirably for at least the first tenth, desirably at least the first quarter of the reaction period of the carbonation reaction.

The pcc product obtained immediately following step (b) in the method according to the first aspect of the invention may comprise a suspension having a solids content of from 10% to 40% percent by weight, e.g. 10% to 20% by weight.

By the concentration step (c), the solids concentration of the suspension comprising the product may be raised to at least about 60% by weight, desirably at least about 70% by weight. Concentration may be carried out in a known way, e.g. by evaporation, filtration or spray drying.

Dispersion step (d) may be applied before or after concentration step (c). It is usually applied after step (c).

The carbon dioxide employed in the method of the invention may be substantially pure carbon dioxide gas e.g. as commercially supplied in a compressed gas cylinder or may be present in a mixture with other gases. The supplied carbon dioxide gas may be diluted with other inert gases, e.g. air, nitrogen, etc. The carbon dioxide may be present as a mixture of spent gases such as flue gases, e.g. obtained from a lime calcination plant in which quicklime is produced for conversion into slaked lime (for use in the method according to the invention).

The aqueous medium in the method according to the first aspect of the invention is desirably subjected to vigorous stirring whilst the carbon dioxide is added, and preferably also prior to carbon dioxide addition, to ensure that carbon dioxide bubbles do not have to travel far to nucleation sites thereby to avoid the establishment of undesirably large numbers of nucleation sites and the formation of unduly fine crystals. Preferably, the mixing is sufficient to avoid localized concentration gradients of the reagents.

Dispersing agents suitable to disperse pcc products in an aqueous suspension are well known in the art and such an agent or mixture of agents may be used in step (d) of the method according to the invention. For example, the dispersing agent may comprise a polycarboxylate such as a homopolymer or copolymer containing one or more monomer units comprising a vinyl or olefinic group which is substituted with at least one carboxylic acid group or a water soluble salt thereof. Examples of suitable monomers are acrylic acid, methacrylic acid, itaconic acid, crotonic acid, isocrotonic acid, aconitic acid, mesaconic acid, suiapinic acid, undecylenic acid, angelic acid and hydroxyacrylic acid. Other co-monomers which may be used together with these monomers to form suitable copolymers include maleic acid and sulfonated vinyl monomers, e.g. 2-acrylamido-2-methyl propane sulfonic acid (AMPS). Where one of these polymeric organic acids is neutralised to form a salt, the neutralization may be partial or full and the neutralizing ion may be selected from monovalent ions such as sodium, potassium and ammonium optionally together with a multivalent ion, such as calcium or magnesium.

Homopolymers and co-polymers and salts thereof produced from acrylic acid are preferred; e.g. the dispersing agent may comprise a sodium polyacrylate.

The weight average molecular weight of the compound or compounds employed as dispersing agent may be in the range 700 to 20,000, preferably from 1000 to 10,000, as measured by the well known method of gel permeation chromatography using a low angle laser light scattering detector.

The amount of dispersing agent employed in step (d) is preferably in the range 0.05% to 3.0%, desirably 0.1% to 2.0%, especially 0.5% to 1.5% by weight based on the dry weight of pcc present.

The aqueous suspension comprising the pcc product obtained following steps (c) and (d) and when concentrated to a solids level of 70% or greater by weight may have a Brookfield viscosity of not more than 500 mPa.s desirably not more than 300 mPa.s (viscosity as measured at 22° C. by a Brookfield Viscometer using a spindle speed of 100 rpm). The Hercules viscosity (which is a measure of the rheological behaviour at high shear rate) of the suspension may be at least 250 rpm at 18 dynes ($18 \times 10^{-5}$N). The suspension is preferably a pumpable flowable slurry.

In order to improve the viscosity particularly the high shear rheology as measured by a Hercules viscometer of the aqueous suspension comprising the pcc product obtained following steps (c) and (d) up to 15% by weight, e.g. from 5% to 10%, by weight of a fine particulate crystalline material, especially fine pcc produced separately, may be added to the pcc product produced in the method according to the first aspect of the invention. This fine material may be added after any of steps (b), (c) or (d) but is preferably added after step (c) and prior to step (d). A suitably fine particulate material is one consisting of particles at least 90% by weight of which have a size, i.e. equivalent spherical diameter, as measured by sedimentation, of less than 1 $\mu$m, especially less than 0.5 $\mu$m. Addition of the fine material may also reduce slightly (e.g. by 0.1 $\mu$m to 0.3 $\mu$m) the median particle size of the final product comprising the pcc product produced by the method according to the invention.

The product slurry or suspension formed in the method according to the present invention may be supplied to the plant in which it is to be used as a coating composition pigment in a known way, e.g. via a slurry transport pipeline by the action of one or more pumps. The product slurry or suspension may or may not be further treated before it is used in a coating composition.

As noted earlier, the pcc product according to the second aspect of the present invention may be employed in a coating composition for coating paper and other sheet materials to provide matte grade coatings for paper and other substrates. Its coarse, blocky nature results in the required lack of gloss for these grades, e.g. a 75° gloss of less than about 40%, preferably not greater than 30% whilst still retaining excellent brightness in the resultant coated product.

Desirably, the particles of the pcc product comprise at least 95%, preferably at least 98% by weight of calcium carbonate. A minor amount of substituents, e.g. magnesium in place of calcium, can be tolerated in the product.

The solids content of the coating composition according to the third aspect of the invention may be greater than 60% by weight, preferably at least 70%, preferably as high as possible but still giving a suitably fluid composition which may be used in coating.

The pcc product made by the method according to the first aspect of the invention may be used as the sole pigment in the paper coating composition according to the third aspect of the invention, or it may be used in conjunction with one or more other known pigments, such as for example, kaolin, calcined kaolin, natural or precipitated calcium carbonate, titanium dioxide, calcium sulphate, satin white, talc and so called 'plastic pigment'. When a mixture of pigments is used the pcc product is preferably present in the mixture in an amount of at least 50%, desirably at least, 80% of the total dry weight of the mixed pigments.

The composition according to the third aspect may include a dispersing agent for the pigment(s) present, e.g. one or more of the agents described earlier in an amount of up to 3% by weight based on the dry weight of the pigment. The dispersing agent may be that applied to the pcc product after step (d) described earlier.

The binder of the composition according to the third aspect of the invention, i.e. a matte grade coating composition employing the pcc product, may conveniently comprise an adhesive selected from one of the hydrophilic adhesives known and used in the production of paper coating compositions. For example, the binder may be selected from polysaccharides such as starches, proteinaceous materials and latices.

Where the binder comprises a starch it may for example be derived from natural starch obtained form a known plant source, for example, wheat, maize, potato or tapioca. The starch may be unmodified or raw starch, or it may be modified by one or more chemical treatments known in the art. The starch may, for example, be oxidised to convert some of its —CH$_2$OH groups to —COOH groups. In some cases the starch may have a small proportion of acetyl, —COCH$_3$, groups. Alternatively, the starch may be chemically treated to render it cationic or amphoteric, i.e. with both cationic and anionic charges. The starch may also be converted to a starch ether, or hydroxyalkylated starch by replacing some —OH groups with, for example, —O.CH$_2$.CH$_2$OH groups, —O.CH$_2$.CH$_3$ groups or —O.CH$_2$.CH$_2$.CH$_2$OH groups. A further class of chemically treated starches which may be used is that known as the starch phosphates. Alternatively, the raw starch may be hydrolysed by means of a dilute acid or an enzyme to produce a gum of the dextrin type.

Where the binder (of the coating composition in which the pcc product is employed) comprises a latex the latex may for example be selected from styrene butadiene latices, acrylic latices, vinyl acetate latices, and styrene acrylic copolymer latices.

The amount of the binder used in the coating composition according to the second aspect is preferably from 4% to 25% by weight, based on the dry weight of pigment(s) present.

Additives in various known classes may, depending upon the type of coating composition and material to be coated, be included in the coating composition. Examples of such classes of optional additive are as follows:

(a) Cross linkers: e.g. in levels 0 to 5% by weight; for example glyoxals, melamine formaldehyde resins, ammonium zirconium carbonates.

(b) Water retention aids: e.g. in up to 2% by weight, for example sodium carboxymethyl cellulose, hydroxyethyl cellulose, PVA (polyvinyl acetate), starches, proteins, polyacrylates, gums, alginates, polyacrylamide bentonite and other commercially available products sold for such applications.

(c) Viscosity modifiers or thickeners: e.g. in levels up to 2% by weight; for example polyacrylates, emulsion copolymers, dicyanamide, triols, polyoxyethylene ether, urea, sulphated castor oil, polyvinyl pyrrolidone, montmorillonite, CMC (carboxymethyl celluloses), sodium alginate, xanthan gum, sodium silicate, acrylic acid copolymers, HMC (hydroxymethyl celluloses), HEC (hydroxyethyl celluloses) and others.

(d) Lubricity aids: e.g. in levels up to 2% by weight, for example calcium stearate, ammonium stearate, zinc stearate, wax emulsions, waxes, alkyl ketene dimer, glycols.

(e) Antifoamers/defoamers: e.g. in levels up to 1% by weight, for example blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

(f) Dry or wet pick improvement additives: e.g. in levels up to 2% by weight, for example melamine resin, polyethylene emulsions, urea formaldehyde, melamine formaldehyde, polyamide, calcium stearate, styrene maleic anhydride and others.

(g) Dry or wet rub improvement and abrasion resistance additives: e.g. in levels up to 2% by weight, for example glyoxal based resins, oxidised polyethylenes, melamine resins, urea formaldehyde, melamine formaldehyde, polyethylene wax, calcium stearate and others.

(h) Ink hold-out additives: e.g. in levels up to 2% by weight, for example oxidised polyethylenes, polyethylene emulsions, waxes, casein, guar gum, CMC, HMC, calcium stearate, ammonium stearate, sodium alginate and others.

(i) Optical brightening agents (OBA) and fluorescent whitening agents (FWA): e.g. in levels up to 1% by weight, for example stilbene derivatives.

(j) Dyes: e.g. in levels up to 0.5% by weight.

(k) Biocides/spoilage control agents: e.g. in levels up to 1% by weight, for example metaborate, sodium dodecylbenene sulphonate, thiocyanate, organosulphur, sodium benzonate and other compounds sold commercially for this function e.g. the range of biocide polymers sold by Calgon Corporation.

(l) Levelling and evening aids: e.g. in levels up to 2% by weight, for example non-ionic polyol, polyethylene emulsions, fatty acid, esters and alcohol derivatives, alcohol/ethylene oxide, sodium CMC, HEC, alginates, calcium stearate and other compounds sold commercially for this function.

(m) Grease and oil resistance additives: e.g. in levels up to 2% by weight, e.g. oxidised polyethylenes, latex, SMA (styrene maleic anhydride), polyamide, waxes, alginate, protein, CMC, HMC.

(n) Water resistance additives: e.g. in levels up to 2% by weight, e.g. oxidised polyethylenes, ketone resin, anionic latex, polyurethane, SMA, glyoxal, melamine resin, urea formaldehyde, melamine formaldehyde, polyamide, glyoxals, stearates and other materials commercially available for this function.

(o) Insolubiliser: e.g. in levels up to 2% by weight.

For all of the above additives, the percentages by weight quoted are based on the dry weight of total pigment (100%) present in the coating composition. Where the additive is present in a minimum amount the minimum amount may be 0.01% by weight based on the dry weight of pigment.

Coating of a sheet material using the coating composition incorporating the pcc product may be carried out in a known way which will depend upon the material to be coated, the particular coating composition to be applied and other factors as determined by the operator, e.g. speed and ease of runnability e.g. using a conventional coating machine.

Methods of coating paper and other sheet materials are widely published and well known. For example, there is a review of such methods published in Pulp and Paper International, May 1994, page 18 et seq. Sheets may be coated on the sheet forming machine, i.e. "on-machine", or "off-machine" on a coater or coating machine. Use of high solids compositions is desirable in the coating method because it leaves less water to evaporate subsequently. However, as is well known in the art, the solids level should not be so high that high viscosity and levelling problems are introduced.

All known methods of coating for use of the coating composition according to the third aspect of the invention require (i) a means of applying the coating composition to the material to be coated, viz an applicator; and (ii) a means for ensuring that a correct level of coating composition is applied, viz a metering device.

When an excess of coating composition is applied to the applicator, the metering device is downstream of it. Alternatively, the correct amount of coating composition may be applied to the applicator by the metering device, e.g. as a film press. At the points of coating application and metering, the paper web support ranges from a backing roll, e.g. via one or two applicators, to nothing (i.e.: just tension). The time the coating is in contact with the paper before the excess is finally removed is the dwell time—and this may be short, long or variable.

DESCRIPTION OF ILLUSTRATIVE EMBODIMENTS OF THE INVENTION

Embodiments of the present invention will now be described by way of example only with reference to the following Examples.

Example 1

A lime slurry was prepared by isothermally slaking calcium oxide in water at a temperature of 15.5° C. The lime particles in the slurry had an average specific surface area of 27 $m^2.g^{-1}$ as measured by the BET, $N_2$ method. The concentration of lime (calcium hydroxide) obtained was 200 g/L. Citric acid was added to the lime slurry to give a citric acid concentration of 0.15% by weight based on the dry weight of pcc to be produced therefrom by carbonation.

The lime slurry plus citric acid mixture was added to a closed batch reactor vessel. The volume of the mixture in the reactor vessel was 11.4 liters (L). The mixture was stirred at a mixing speed of 700 rpm. The temperature inside the reactor vessel was adjusted to be 9° C. and carbon dioxide was admitted into the reactor vessel at a rate to give a required carbonation reaction rate of 0.65 g/min/L.

The stirring was continued at a rate of 700 rpm during carbonation. Carbonation was continued until all of the lime present in the reactor vessel had been consumed as detected by a fall in pH. $CO_2$ addition was continued for a short period after the pH became steady. The pcc product remaining in aqueous suspension in the reactor vessel was sampled and found to consist of particles having a median particle size of about 2.5 μm.

The resulting pcc slurry was concentrated by spray drying to provide a solids concentration of about 72% by weight. The concentrated, dispersed pcc product was further sampled and found to have a median particle size of about 2.2 μm. Scanning electron microscopy showed that the product consisted of calcite crystals having a rhombic, prismatic form. The product was found to have a Blaine surface area of 12,00 $cm^2/g$ and for an aqueous dispersed suspension having a solids concentration of 72% a Brookfield viscosity at 20 rpm and 22° C. of 80 mPa.s and a Hercules viscosity of 220 rpm at 18 dynes ($18 \times 10^{-5}$N).

Example 2

A procedure was carried out in a manner similar to that described in Example 1, except that the following different process conditions were employed in this case. The slaking temperature was 38° C. (giving a lime specific surface area of about 31.5 $cm^2.g^{-1}$ BET, $N_2$), and the initial carbonation temperature was 12° C. The volume of lime slurry in the reactor vessel was 16,000 gallons (73,000 L) and the concentration of citric acid was 0.125% by weight based on the dry weight of pcc product. The carbonation reaction rate was 1.4 g/Lmin.

The pcc product obtained in the reactor vessel after the carbonation reaction had a mean particle size of about 2.64 μm. This was reduced to about 2.1 μm following concentration to 70% by weight solids and dispersion. The crystalline form was similar to that obtained in Example 1. The Blaine surface area was 12,600 $cm^2/g$.

Example 3

A procedure was carried out in a manner similar to that described in Example 1 except that the following different process conditions were employed. The slaking temperature was 38° C. (giving a lime specific surface area as in Example 2) and the initial carbonation temperature was 12° C. The volume of the lime slurry in the reactor vessel was 13,500 gallons (61,000 L) and the concentration of citric acid was 0.10% by weight based on the dry weight of pcc product. The carbonation reaction rate was 1.2 g/Lmin.

The pcc product obtained in the reactor vessel after the carbonation reaction had a median particle size of 2.56 μm and a Blaine specific surface area of 11,500 $cm^2.g^{-1}$.

Following concentration to 71.0% weight solids and dispersion the median particle size was reduced to about 2.15. The pcc product showed a crystal form similar to that obtained in Example 1.

The product was found to have the following properties:

(i) a specific particle surface area of 4 $m^2$/g measured by the BET nitrogen absorption method;

(ii) at least 65% by weight of the particles of the product showed a particle size of between 5 μm and 1 μm;

(iii) a Brookfield viscosity of 144 mPa.s at 20 rpm and 22° C.; and (iv) a Hercules viscosity of 330 rpm at 18 dynes ($18 \times 10^{-5}$N).

We claim:

1. A method of producing a precipitated calcium carbonate (pcc) product which has a coarse crystalline form which comprises the steps of:

(a) preparing a suspension in an aqueous medium of calcium hydroxide particles which partially dissolve as calcium ions in the aqueous medium, the aqueous medium also incorporating an agent which promotes release into solution in the aqueous medium of calcium ions from the calcium hydroxide;

(b) adding carbon dioxide to the aqueous medium to react with the calcium ions therein to produce a suspension in the aqueous medium of a precipitate of calcium carbonate crystals;

(c) concentrating the suspension of the precipitate by a dewatering process; and (d) adding to the suspension of the precipitate a dispersing agent for the precipitate;

wherein in step (a) the calcium hydroxide particles of the suspension of calcium hydroxide particles have a specific surface area measured by the BET nitrogen method of less than 33 $m^2$/g and the said agent comprises a water soluble organic compound present in an amount of from about 0.01% to about 0.20% by weight based on the dry weight of calcium carbonate to be produced from the calcium hydroxide in the aqueous medium, and in step (b) the carbon dioxide is first added to the aqueous medium when the temperature of the aqueous medium is in the range from about 5° C. to about 12° C. and is added at a rate such that the average rate of reaction of carbon dioxide and calcium ions expressed as weight of precipitate per unit time per unit volume of aqueous medium is in the range from about 0.4 g/min/L to about 2.0 g/min/L.

2. A method as claimed in claim 1 wherein the organic compound is a calcium chelating agent.

3. A method as claimed in claim 2 wherein the organic compound comprises citric acid or a citrate.

4. A method as claimed in claim 1 wherein in step (a) the suspension is prepared by adding calcium oxide to the aqueous medium, the temperature of the aqueous medium being less than 40° C. at the start of the addition.

5. A method as claimed in claim 1 wherein during step (b) the carbon dioxide and the calcium ions react over a reaction period and the aqueous medium is maintained in the range 5° C. to 12° C. for at least the first tenth of the reaction period.

6. A method as claimed in claim 1 wherein during the reaction between the carbon dioxide and the calcium ions the aqueous medium is vigorously mixed.

7. A method as claimed in claim 1 wherein after one of steps (b), (c) or (d) up to 15% by weight of a fine particulate material is added to the precipitate of calcium carbonate crystals produced by the reaction in step (b).

8. A method as claimed in claim 7 wherein the fine particulate material consists of particles at least 90% of which, by weight, have an equivalent spherical diameter of less than 1 μm.

9. A method as claimed in claim 8 and wherein the fine particulate material comprises a separately prepared precipitated calcium carbonate product.

10. A method as claimed in claim 1 wherein the median particle size of the precipitate produced in step (b) is reduced by an increment in the range 0.2 μm to 0.6 μm by application of steps (c) and (d).

11. A precipitated calcium carbonate product for use in coating compositions to provide a dull, matte surface finish the product comprising particles having the following properties:

(i) a calcite crystal form comprising rhombic, prismatic crystals;

(ii) a median particle size of from about 1.8 μm to about 2.7 μm;

(iii) at least 60% by weight of the particles have a particle size of from about 5 μm to about 2 μm.

12. A precipitated calcium carbonate product as claimed in claim 11 wherein the specific surface area of the particles is not greater than about 5.5 $m^2.g^{-1}$ measured by the BET nitrogen absorption method and the Blaine surface area of the particles of the product is in the range from about 11,000 $cm^2.g^{-1}$ to about 13,000 $cm^2.g^{-1}$.

13. A precipitated calcium carbonate product as claimed in claim 11 wherein the amount of particles of the product having a size less than 1 μm is less than about 12% by weight.

14. A precipitated calcium carbonate product as claimed in claim 11 wherein the product is in admixture with up to 15% by weight of a fine particulate material comprising particles of at least 90% by weight of which have an equivalent spherical diameter of less than 1 μm.

15. A coating composition comprising a hydrophilic adhesive and an aqueous suspension containing 60% or more by weight of a particulate pigment material, wherein the particulate pigment comprises the precipitated calcium carbonate product claimed in claim 14.

16. A coating composition comprising a hydrophilic adhesive and an aqueous suspension containing 60% or more by weight of a particulate pigment material, wherein the particulate pigment comprises the precipitated calcium carbonate product claimed in claim 11.

* * * * *